Dec. 11, 1945.  R. E. KILGORE  2,390,653
CUT-OFF TOOL HOLDER
Filed March 14, 1944
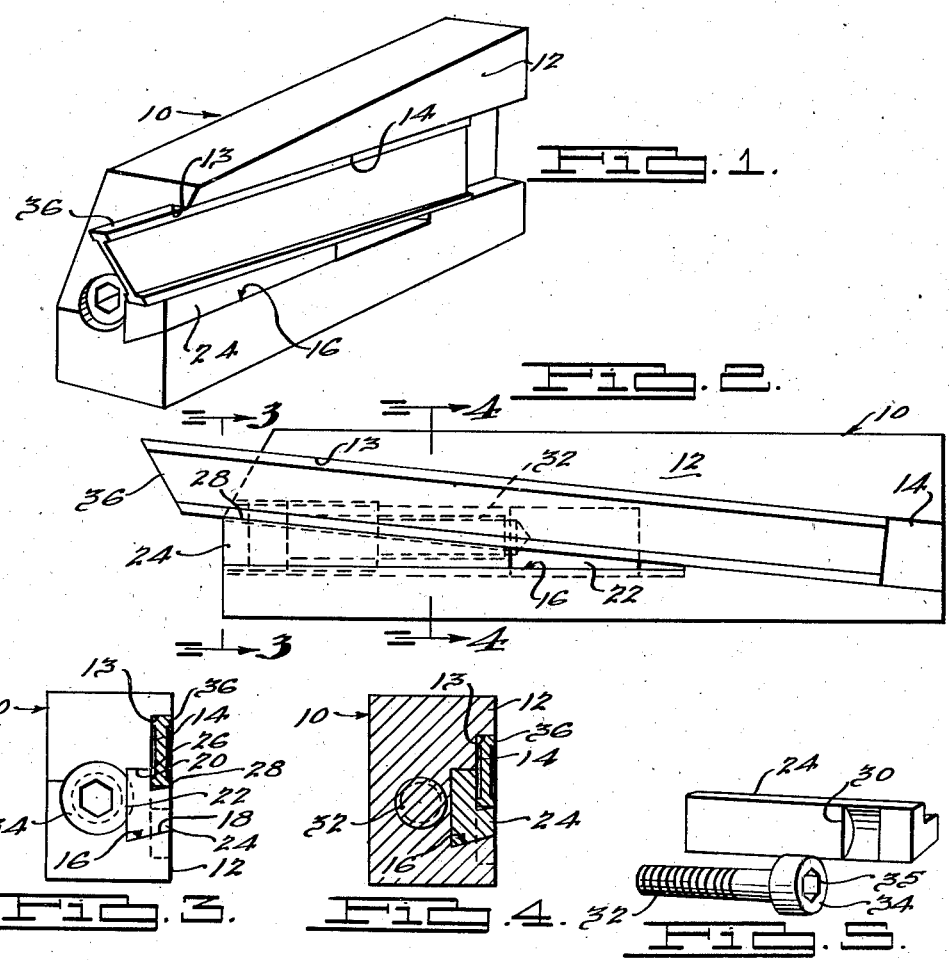
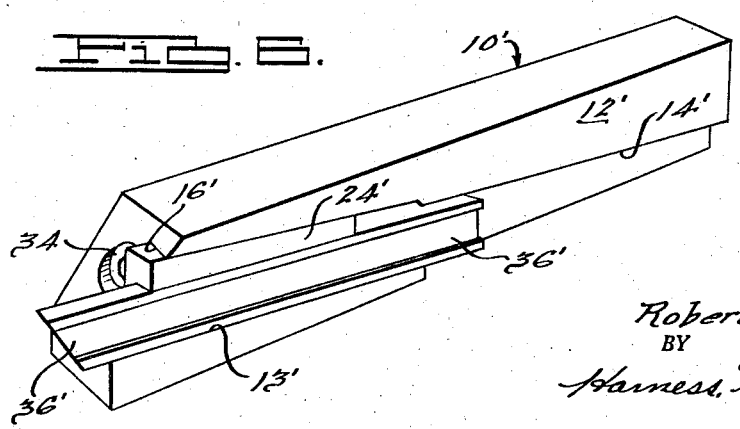
INVENTOR.
Robert E. Kilgore.
BY
Harness, Dickey & Pierce.
ATTORNEYS.

Patented Dec. 11, 1945

2,390,653

UNITED STATES PATENT OFFICE 2,390,653

CUTOFF TOOLHOLDER

Robert E. Kilgore, Detroit, Mich., assignor to N. A. Woodworth Company, Ferndale, Mich., a corporation of Michigan Application March 14, 1944, Serial No. 526,443

3 Claims. (Cl. 29—96)

This invention relates to cut-off tool holders and particularly to those types thereof employed for supporting a tool or blade used in cutting off rotating pieces of work in a lathe, screw machine or the like, the principal object being the provision of a tool holder of this type that is simple in construction and extremely efficient in operation.

Objects of the invention include the provision of a cut-off tool holder in which a cut-off tool bit, cutter or blade may be supported in a superior manner; the provision of a cut-off tool holder in which the cut-off tool or blade is supported along both its upper and lower surfaces over a relatively extended length; the provision of a cut-off tool holder of extremely rigid construction and so constructed and arranged as to support a cut-off tool or blade therein and to impart thereto the rigidity of the holder itself; and the provision of a cut-off tool holder embodying a rigid integral abutment for one edge of the cut-off tool and a cooperating wedge adapted to be interposed between the cut-off tool end and opposed integral abutment of the holder and providing an extended length of contact between it and the cut-off tool.

The above being among the objects of the present invention the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a perspective view of a cut-off tool holder constructed in accordance with the present invention and showing a cut-off tool operatively mounted therein;

Fig. 2 is a side elevational view of the structure shown in Fig. 1;

Fig. 3 is a front elevational view of the tool holder shown in the preceding views and taken as on the line 3—3 of Fig. 2;

Fig. 4 is a transverse vertical sectional view taken on the line 4—4 of Fig. 2;

Fig. 5 is an exploded view of the adjusting wedge and its operating screw; and,

Fig. 6 is a view similar to Fig. 1 but illustrating a modified form of construction wherein the wedge member is positioned above the cut-off tool rather than below it as in the preceding figures.

Cutting-off tools or blades for cutting off rotating pieces of work in a lathe, screw machine or the like must be rigidly and securely mounted if they are to be capable of consistently performing the desired operations without chattering, digging, or breakage of the cutter blade or cut-off tool proper. It is, therefore, the object of the present invention to provide a cutting off tool holder capable of supporting the cutting tool in the desirable rigid manner and in itself being capable of being extremely rigidly constructed and so supporting the cut-off tool as to impart its rigidity to the cut-off tool. To this end the tool holder comprises a solid block or member of metal, preferably steel, having a groove or recess formed in one side thereof providing opposed and integral and, therefore, substantially unyielding abutments against one of which an edge of the cut-off tool is adapted to bear with extended surface contact. At least a portion of the opposite wall of the groove is disposed at an angle to the above mentioned wall and receives thereon a relatively elongated wedge member, an upper face of which lies in parallelism with the first-mentioned wall. The cutter blade is adapted to be interposed between such wedge and the first-mentioned wall and, therefore, has an extended length of contact with the wedge member. Means are provided for mechanically moving the wedge member longitudinally of the recess whereby to cause the cut-off tool to be wedge firmly between it and the first-mentioned wall.

In the broader aspects of the invention the particular shape or form of the holder, that is its general contour, is more or less unimportant as long as it is of a strong rigid nature, this latter being important for the reason that inasmuch as the strength of the holder is imparted to a great extent to the blade or cut-off tool itself the former should be strong and rigid to impart the same quality to the cut-off tool. It will be appreciated by those skilled in the art that where the holder is intended to be supported by the usual tool post of a lathe it will necessarily embody one form of construction or formation and when adapted for use in a screw machine it will necessarily embody different conformation, and will even necessarily embody different conformations in order to adapt it to screw machines of different makes or types. However, for the purpose of illustration, in the drawing the holder which is indicated generally at 10 is shown as being formed from a block of generally rectangularly sectioned steel which is a form which adapts it for use with certain types of screw machines. Regardless of the conformation of the holder 10, in any event it will have one flat or substantially flat face such as 12 which is cut away or otherwise formed to provide an inwardly extending face 13 perpendicular to the plane of the face 12 and forming an abutment for one edge of a cooperating cut-off tool or blade. In the particular case shown the face 13 constitutes the upper wall of a rectangularly sectioned groove or recess 14 formed in the face 12 of the body 10 but it is to be understood that in the broader aspects of the invention that no groove 14 as such, and independent of an abutment opposed to the face 13 for reception of the wedge hereinafter described, is necessary. The cross-sectional size and conformation of the groove or recess 14 in the construction shown is constant over its length except over those portions thereof which are cut away for reception of the wedge as will hereinafter be more fully explained. In the particular case shown the groove or recess 14 is inclined with respect to the top and bottom faces of the holder 10 but this is a feature which is not essential although desirable in many cases in order to provide the desired rake angle for the cutting edge of the cut-off tool or blade.

Where the cooperating wedge member is not the full length of the recess or groove 14, then that portion of one of the opposite walls of the groove or recess 14 is cut away for cooperative reception of the wedge member. In the construction illustrated in Figs. 1 to 5, inclusive, it is assumed that the wedge is to be positioned at the bottom of the groove or recess 14 and consequently the lower and forward portion of such wall is cut away to form a supplementary groove or recess indicated generally at 16. The supplementary groove 16 includes a lower wall 18 inclined laterally inwardly and downwardly from the face 12 and at an angle to the upper face 13 of the groove or recess 14 when viewed in side elevation, it diverging from the face 13 in extending toward the front or operative end of the holder. It also includes an upper horizontal wall 20 which projects inwardly beyond the inner wall of the groove or recess 14 and a rear vertical wall 22 connecting the inner edges of the walls 18 and 20. The walls 18 and 20 are vertically spaced from each other by a constant depth over the length of the supplementary groove 16.

Within the supplementary groove 16 is slidably received the wedge member 24 which is of a cross-sectional configuration complementary to the cross-sectional configuration of the supplementary groove 16 except that its upper outer corner is cut away or notched to provide a vertical face 26 arranged in flush relationship with respect to the inner vertical wall of the groove or recess 14, and a bottom or cut-off tool abutment face 28 arranged in parallelism with the upper side wall 14 of the groove or recess 14 as viewed in side elevation. Preferably, and as best brought out in Figs. 3 and 4, the wedge member 16 is of no greater width than the lateral depth of the supplementary groove or recess 16 so that its outer face does not project outwardly beyond the side face 12 of the holder 10. This is so that this face of the holder may be clamped against a supporting surface, if necessary, in applying the holder to machine tool. Being of the same cross-sectional configuration as the supplementary groove 16, the wedge 24 is slidable longitudinally of the supplementary groove 16.

The inner or back face of the wedge 24, as best brought out in Fig. 5, is cut away to provide a groove for receiving the head of an adjusting screw. While this groove may be a plain groove with flat sides, that shown and indicated at 30 is provided with a partially cylindrical recess therein having parallel front and rear walls perpendicular to its inner face. A screw 32 having a cylindrical head 34 of a length and diameter to be relatively closely but slidably received in the recess 30 is threaded into the holder 10 from the front end thereof in parallelism with the path of movement of the wedge 24 in the supplementary groove 16. Because of the inter-engaging relation of the head 34 of the screw 32 and the walls of the recess 30 in the wedge 24, it will be appreciated that the screw 32 in being threaded inwardly or outwardly in the holder 10 causes a corresponding movement of the wedge 24. The head 34 of the screw 35 is, of course, formed for reception of a suitable turning tool, in the case shown with a socket 35 centrally thereof for receiving a conventional type of wrench.

The cut-off tool or blade 36 may be of any suitable or conventional type such as shown and, of course, including parallel upper and lower edges. It is inserted in the holder with its upper edge abutting against the upper wall or face 13 of the recess 14, its inner face abutting the inner face of the recess 14 and the wall 26 of the wedge 24, and its lower edge rests on or abuts against the blade abutment face 28 of the wedge 24. As brought out in Figs. 3 and 4 the face 28 is preferably inclined laterally inwardly and downwardly a slight amount so that when the clamping force is applied thereby to the blade 26 it will tend to draw the lower edge thereof firmly inwardly against the wall 26 thereof.

In practice, in the use of the tool described, in order to insert a blade 36 a wrench is applied to the opening 35 in the head of the screw 34 and the screw 32 is turned in a direction to move it outwardly with respect to the holder. This, of course, has the effect of increasing the distance between the abutment face 28 of the wedge 24 and the upper wall 13 of the groove or recess 14. When these surfaces have been separated sufficiently to permit the insertion of the blade 36 therebetween, the blade 36 is inserted into position and then the wrench is turned to screw the screw 32 inwardly of the holder 10. This draws the wedge 24 inwardly and decreases the distance between the abutment face 28 thereof and the face 13 of the groove or recess 14, and this movement of the wedge is continued until the blade 36 is securely clamped between these faces 13 and 28.

It will be understood that in drawing the wedge 24 into the position above described, because of the inclination of the lower face 18 of the supplementary groove 16 the wedge member 24 itself will be forced firmly against both the bottom wall 18 and the inner wall 22 of the supplementary groove, and because of the inclination of the abutment face 28 of the wedge 24 the lower edge of the blade 36 will also be urged inwardly and into firm abutting relationship with respect to the vertical wall 26 of the wedge. Thus the blade 36 is firmly wedged between the face 13 of the groove or recess 14 and the wedge 24 which wedge is itself wedged between the blade and the lower wall 18 of the supplementary recess 16. Because of the fact the upper edge of the blade 36 has an extended area of contact with the upper wall or face 13 of the groove or recess 14, the lower face of the wedge 24 has an extended area of contact with the lower wall 18 of the supplementary groove 16, and the wedge 16 and blade 36 have an extended length of contact, and because of the fact that the upper wall of the groove or recess 14 and the lower wall 18 of the supplementary groove 16 are an integral and rigid part of the one-piece holder 10, an extremely rigid support is provided for the cutter blade 36 and one of such character that when the blade 36 is clamped in position there is no tendency to warp the blade out of its straight condition but rather a tendency to maintain it rigidly against warpage.

Because of the rigidity of the construction and particularly the rigidity and firmness with which the cutter blade is supported in the holder it will be appreciated that it makes little difference whether the wedge is located at the bottom edge of the cutter blade as illustrated in Figs. 1 to 5, inclusive, in which the direct force of the cut taken by the blade 36 is transmitted through the wedge, or whether the wedge is positioned at the upper edge of the cutter blade so that the force of the cut is transmitted from the cutter blade directly to the body of the holder. This last form of construction is illustrated in Fig. 6 and inasmuch as the construction is the same as that illustrated in the previous figures except for this change it is unnecessary, particularly where equivalent parts are indicated by the same numerals as in the preceding figures except that such numerals bear a prime mark, to more than briefly explain the construction.

Perhaps the main thing to note in the construction illustrated in Fig. 6 is that the groove or recess 14' runs out into the bottom face of the holder 10' before it reaches the rear end of the holder and the supplementary recess 16' is formed in the upper wall of the groove or recess 14' instead of the lower wall as in the previously described construction so that the wedge 24' in this case is positioned above the blade 36' instead of below it as in the previous case. The supplementary recess 16' in this case is of the same cross-sectional configuration as the supplementary recess 16 previously described except reversed or turned over and the wedge 24' is formed to correspond.

Having thus described my invention what I claim by Letters Patent is:

1. A cut-off tool holder comprising, in combination, a rigid one-piece body having a longitudinally extending recess in one side face thereof, said recess having an upper wall and a lower wall, said walls being arranged at an acute angle with respect to each other longitudinally of said holder and one of said walls being inclined inwardly of said face away from the other of said walls, a relatively elongated wedge member arranged for surface-to-surface contact with the last-mentioned wall and in abutting relationship with respect to an inner wall portion of said recess, the upper edge of said wedge being formed to provide a generally horizontally directed face arranged in longitudinally parallel relation with respect to said other of the first-mentioned walls of said recess and a vertically directed wall lying in the same plane as the inner wall of said recess immediately adjacent but outwardly spaced from said other wall of said recess, and means for mechanically controlling the position of said wedge member longitudinally of said recess.

2. A cut-off tool holder comprising, in combination, a body having a flat side face and a groove formed in said face, the upper and lower walls of said groove being arranged at an acute angle to each other longitudinally of said body, the inner face of said groove being stepped whereby to provide a deep portion and a shallow portion for said groove, said deep portion being bounded at one side by one of the first-mentioned walls, the wall joining said stepped surfaces being parallel to one of the first-mentioned walls, a member fitting within said deep portion of said groove and slidable therein longitudinally of said body, said member being of such thickness that its outer face is substantially flush with said side face of said body when assembled thereto, mechanical means cooperating between said member and body for effecting relative movement therebetween longitudinally of said body, and an edge of said member adjacent said shallow portion of said groove being notched to a depth corresponding to the depth of said shallow portion and said notch having a wall in opposed and parallel relation with respect to that one of the first-mentioned walls bounding said shallow portion.

3. A cut-off tool holder comprising, in combination, a body having a flat side face and a groove formed in said face, the upper and lower walls of said groove being arranged at an acute angle to each other longitudinally of said body, the inner face of said groove being stepped whereby to provide a deep portion and a shallow portion for said groove, said deep portion being bounded at one side by one of the first-mentioned walls, the wall joining said stepped surfaces being parallel to one of the first-mentioned walls, a member fitting within said deep portion of said groove and slidable therein longitudinally of said body, said member being of such thickness that its outer face is substantially flush with said side face of said body when assembled thereto, mechanical means co-operating between said member and body for effecting relative movement therebetween longitudinally of said body, an edge of said member adjacent said shallow portion of said groove being notched to a depth corresponding to the depth of said shallow portion and said notch having a wall in opposed and parallel relation with respect to that one of the first-mentioned walls bounding said shallow portion, and a substantially flat cutter blade having parallel edges received in said shallow portion of said groove and in said notch and overlying the step in said inner wall of said groove.

ROBERT E. KILGORE.